June 17, 1924.
J. G. McCORKLE
ROD PACKING
Filed Sept. 16, 1919
1,498,104
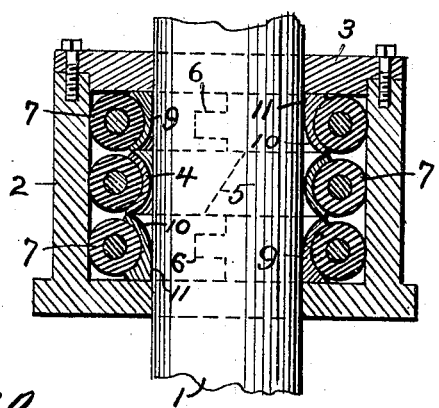
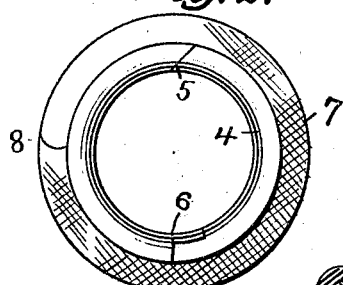
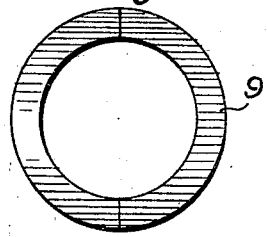
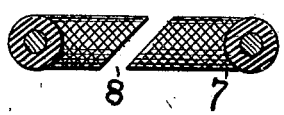
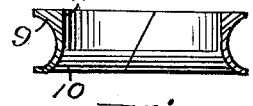
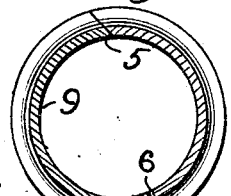
WITNESSES
Guy M. Spring
V. B. Hillyard.
Inventor
JOSEPH G. McCORKLE
By Richard B. Owen
Attorney Patented June 17, 1924.

1,498,104

UNITED STATES PATENT OFFICE.

JOSEPH G. McCORKLE, OF PITTSBURGH, PENNSYLVANIA, ASSIGNOR OF ONE-HALF TO IRVING U. EGGERT, OF DORMONT, PENNSYLVANIA.

ROD PACKING.

Application filed September 16, 1919. Serial No. 324,105.

*To all whom it may concern:*

Be it known that I, JOSEPH G. McCORKLE, a citizen of the United States, residing at Pittsburgh, in the county of Allegheny and State of Pennsylvania, have invented certain new and useful Improvements in Rod Packing, of which the following is a specification.

The invention has for its primary object to provide a packing for piston rods, the purpose being the provision of a packing which may be easily and readily placed in position without requiring the displacement of the piston rod and which will insure a close fitting at all times and reduce the friction to the smallest amount possible while at the same time maintaining a close joint to prevent loss of pressure.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the accompanying drawings,

Fig. 1 is a sectional view of a stuffing box provided with a packing embodying the invention and showing part of a piston rod.

Fig. 2 is a plan view of a packing unit consisting of an inner sectional metal ring and an outer fibrous ring.

Fig. 3 is a sectional view of the packing unit showing one of the joints of the metal ring.

Fig. 4 is a view similar to Fig. 3, showing another form of joint of the metal ring.

Fig. 5 is a plan view of the metal ring.

Fig. 6 is a sectional view thereof.

Fig. 7 is a central section of the metal ring in the plane thereof.

Fig. 8 is a sectional view of the fibrous ring, showing the joint.

Corresponding and like parts are referred to in the following description and indicated in the several views of the drawings by like reference characters.

The numeral 1 designates a piston rod or like part adapted to receive a packing embodying the invention. The stuffing box 2 is closed by means of a gland 3 in a manner well understood and the packing is located within the stuffing box and comprises a plurality of units, each consisting of an inner metal ring and an outer fibrous ring, both being preferably of a jointed structure to admit of the packing being placed about the rod without the necessity of removing the piston or rod.

As shown most clearly in Fig. 1 of the accompanying drawings, the packing comprises intermediate and end units. The end units are of similar or like formation, whereas the intermediate unit is slightly different in that the metal ring is of concavo-convex form in cross section, whereas the metal rings of the end units have a portion of their walls made rounding and a portion straight. The metal rings comprise at least two sections to admit of the rings being placed about the rod 1 without necessitating the removal or displacement of the rod. The fibrous ring is split, although it may be likewise of sectional formation. By reason of the nature of the fibrous ring and having the same split it may be tilted about the rod 1. The metal ring of the intermediate packing unit is indicated at 4 and its inner and outer walls or faces are transversely curved. The metal ring 4, as shown comprises two sections which are jointed at 5 and 6. The joint 5 is diagonal, whereas the joint 6 consists of a matching tongue and groove, as indicated most clearly in Fig. 4. The metal rings are grooved in their outer faces to form seats in which are fitted the rings 7 which preferably are of fibrous construction, although they may consist of any material generally employed for packing purposes. The packing rings 7 are split, as indicated at 8 and such split is preferably on a diagonal line. An opening is formed centrally through the packing rings to increase their resiliency.

The terminal or end metal rings are indicated at 9 and their outer faces are depressed to form seats in which the packing rings 7 are fitted. The inner wall or face of the rings 9 comprises a rounded portion 10 and a straight portion 11. The rounded portion 10 is disposed inwardly, whereas the straight portion 11 is arranged outwardly, so as to align with the openings formed in the gland 3 and inner wall of the stuffing box. It is to be understood that there may be any number of intermediate packing units, although the packing illustrated comprises two end units and one intermediate unit. The manner of joining the sections of the metal rings is unimportant and such joints may be of any formation, but ordinarily it is sufficient if each metal ring comprises two similar sections which are jointed at diametrically opposite joints which are indicated most clearly at Figs. 2 and 5.

Having thus fully described my invention, what I claim as new and desire to secure by Letters Patent is:—

A packing comprising intermediate and end units: each unit comprising a sectional metal ring split at an angle to the axis of the ring at one end of each section, and provided with an interlocking means at the other end of each section, and a fibrous ring split at an angle to its axis at its adjoining ends; the metal ring of the intermediate unit being trough shaped and concavo-convex in cross section, said last named ring being further of uniform thickness in cross section throughout its width; the metal ring of each end unit having a groove concave in cross section upon the outer face thereof and being provided with a cylindrical wall upon a portion of its inner face terminating in an abutment end wall at right angles to said cylindrical wall, the inner end ring having its inner portion of such thickness as to hold the fibrous end ring above said abutment end wall.

In testimony whereof I affix my signature in presence of two witnesses.

JOSEPH G. McCORKLE.

Witnesses:
HUGH M. SEILLEY,
PEARL M. MERIT.